United States Patent
Dital et al.

(10) Patent No.: US 11,321,776 B2
(45) Date of Patent: May 3, 2022

(54) SYSTEM AND METHOD FOR PROVIDING ADDITONAL MONTHLY INCOME BY CAPITALIZING EXPECTED ANNUAL TAX REFUND TO MONTHLY PAYMENTS AND OR PREDICTING ACCURATE TAX WITHHOLDINGS FOR CERTAIN TAXPAYERS

(71) Applicant: Intuit Inc., Mountain View, CA (US)

(72) Inventors: Gilaad Dital, Tel Aviv (IL); Yair Horesh, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/860,102

(22) Filed: Apr. 28, 2020

(65) Prior Publication Data

US 2021/0334897 A1    Oct. 28, 2021

(51) Int. Cl.
G06Q 40/00     (2012.01)
G06Q 40/02     (2012.01)
G06N 20/00     (2019.01)

(52) U.S. Cl.
CPC .......... *G06Q 40/025* (2013.01); *G06N 20/00* (2019.01); *G06Q 40/10* (2013.01)

(58) Field of Classification Search
CPC ....... G06Q 40/025; G06Q 40/10; G06N 20/00
See application file for complete search history.

(56) References Cited

U.S. PATENT DOCUMENTS

| | | | | |
|---|---|---|---|---|
| 7,900,298 B1 * | 3/2011 | Char | .................. | G06Q 40/00 5/31 |
| 8,447,667 B1 * | 5/2013 | Dinamani | ............ | G06Q 40/025 705/31 |
| 9,128,911 B1 * | 9/2015 | Howe | .................. | G06Q 40/10 |
| 11,145,005 B2 * | 10/2021 | Brock | ................. | G06Q 40/025 |
| 2012/0330820 A1 * | 12/2012 | Galit | ..................... | G06Q 40/02 705/38 |
| 2018/0349986 A1 * | 12/2018 | Fidanza | ................ | G06N 20/00 |
| 2021/0133894 A1 * | 5/2021 | Reses | .................. | G06Q 40/025 |

FOREIGN PATENT DOCUMENTS

WO    WO-2013126982 A1 *   9/2013   .......... G06Q 40/025

OTHER PUBLICATIONS

Anonymous, "System and Method to Assist the Foreign Visitors in the Process of Receiving Tax Refunds and Provide Marketing Promotions from Affiliated Stores," IP.com No. IPCOM000242115D (Year: 2015).*

Lois M. Quinn, "Use of Refund Anticipation Loans by Earned Income Tax Credit Filers in Central City Milwaukee Neighborhoods," University of Wisconsin Milwaukee UWM Digital Commons ETI Publications Employment and Training Institute (Year: 2002).*

* cited by examiner

*Primary Examiner* — Alexander G Kalinowski
*Assistant Examiner* — William B. Bunker
(74) *Attorney, Agent, or Firm* — DLA Piper LLP (US)

(57) ABSTRACT

Systems and methods that may be used to provide a predictive tax loan or other monetary advance before the loan recipient (e.g., a taxpayer) prepares and files its tax return. A risk of providing a predictive tax loan or monetary advance is modeled separately from a machine learning model used to determine the anticipated tax refund amount and tax loan. The disclosed systems and methods may also predict accurate tax withholdings based on multiple machine learning models from multiple services, including non-payroll related services.

14 Claims, 5 Drawing Sheets

SYSTEM AND METHOD FOR PROVIDING ADDITONAL MONTHLY INCOME BY CAPITALIZING EXPECTED ANNUAL TAX REFUND TO MONTHLY PAYMENTS AND OR PREDICTING ACCURATE TAX WITHHOLDINGS FOR CERTAIN TAXPAYERS

BACKGROUND

In today's market, there are financial institutions, corporations, online and other tax preparation services that offer monetary advances to clients and or other tax payer's based on the taxpayer's anticipated tax refund as determined by his/her as-filed tax return. These advances are often referred to as "tax refund loans" and are essentially short-term advances on a tax refund a taxpayer expects to receive based on his/her as-filed tax return. The loan is provided as a lump sum amount, often ranging from $200 to $3500. The loan amount is deducted from the taxpayer's refund by the institution, corporation, or service after the refund is issued by the tax authority (e.g., Internal Revenue Service (IRS), state tax authority).

The current process has some undesirable shortcomings. For example, current tax refund loans are only available after the taxpayer's tax return has been formally submitted and accepted by the tax authority. Many taxpayer's, however, cannot wait that long and may want the tax refund loan early—i.e., before submitting their tax returns. For example, many taxpayers often live paycheck to paycheck and could use the anticipated tax refund or portions of it to supplement his/her weekly or monthly income. Moreover, these and other taxpayers may desire advanced monthly payments, meaning that an anticipated tax refund must be determined several months to a year in advance to fulfill the taxpayer's needs. As can be appreciated, providing monthly unsecured payments several months to a year in advance of the taxpayer's tax return filing and unknown tax refund amount is a risky proposition for the tax loan provider as the taxpayer's tax situation, and hence its ability to repay the loan, may change by the time its tax return is filed.

Accordingly, there is a need and desire for a method of providing a tax loan or other monetary advance that may be spread out over monthly installments and prior to a taxpayer's tax return filing. There is also a need and desire to minimize risk to the provider of the loan/advance, particularly when it is provided months before the taxpayer's tax filing and his/her actual tax refund amount is determined.

Another way for a taxpayer to have more monthly income is to better estimate his/her paycheck tax withholdings. It is known to withhold taxes from a taxpayer's paycheck to help offset the taxpayer's annual state and federal tax liability. In many cases, the taxpayer gets a refund returning excess tax withholdings. Many taxpayers would prefer withholding less taxes and having more money per pay period, then having an annual tax refund. However, the taxpayer does not know his/her expected annual income and anticipated deductions to properly forecast his/her tax liability. Often times, this uncertainty causes the tax withholdings to be larger than necessary. Accordingly, there is a need and desire to properly forecast a taxpayer's paycheck tax withholdings to minimize over-taxation and increase the taxpayer's take home pay.

DETAILED DESCRIPTION OF SEVERAL EMBODIMENTS

Embodiments described herein may be used to provide additional monthly income to certain taxpayers. For example, in one embodiment, a predictive tax loan or other monetary advance is determined and may be provided before the loan recipient (e.g., a taxpayer) prepares and files its tax return. In one or more embodiments, the predictive tax loan may be spread out over monthly installments. In one or more embodiments, for qualifying taxpayer's the monthly installments may be dynamically adjusted based on an updated evaluation of the taxpayer's situation and other related information. In one or more embodiments, the loan provider's (e.g., tax service) risk is mitigated by determining a risk level for the tax payer and only providing the loan for low risk taxpayer's.

In one or more embodiments, the risk of providing a predictive tax loan or monetary advance is modeled separately from a machine learning model used to determine the anticipated tax refund amount. In one or more embodiments, eligible taxpayers may be provided with a monthly loan-like payment that is expected to be paid back by the future predicted annual tax refund amount. In one or more embodiments, taxpayer's that allow the disclosed system and method to more know more about themselves, such as taxpayer's within an online community or taxpayer's that participate in surveys throughout a year may be provided with more precise initial estimates and dynamically adjusted monthly loan installments.

One or more embodiments described here may be used to provide additional monthly income to certain taxpayers by determining and providing predictive tax withholdings to better estimate a taxpayer's paycheck withholdings and mitigate over-taxation. In one or more embodiments, one or more machine learning tax withholdings models are trained based on various attributes and the trained models are used to predict more accurate tax withholdings, providing the taxpayer with more take home pay while still meeting its anticipated tax obligations.

Figure 1:
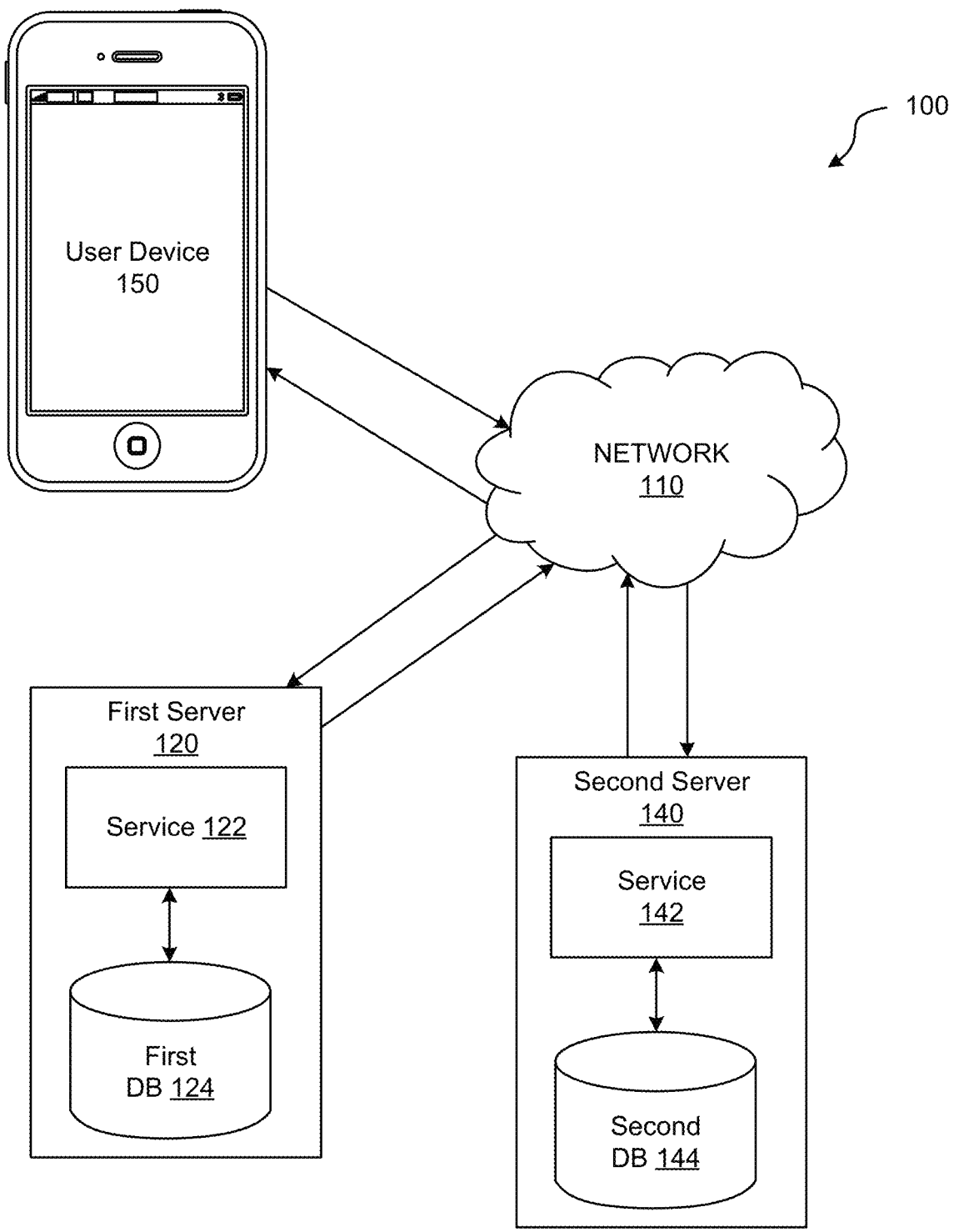
FIG. 1 shows an example of a system configured to implement a process for providing additional monthly income by providing a risk mitigated predictive tax loan and or predictive tax withholdings in accordance with an embodiment of the present disclosure.

FIG. 1 shows an example of a system 100 configured to implement a process for providing additional monthly income by providing a risk mitigated predictive tax loan and or predictive tax withholdings according to an embodiment of the present disclosure. System 100 may include a first server 120, second server 140, and/or a user device 150. First server 120, second server 140, and/or user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 110 may be the Internet and/or other public or private networks or combinations thereof.

First server 120 may be configured to implement a first service 122, which in one embodiment may be used to input data suitable for training the machine learning models disclosed herein and or input the data used to determine tax loans and withholdings in accordance with the disclosed principles. In one or more embodiments, the data may be input via network 110 from one or more databases 124, 144, the second server 140 and/or user device 150. For example, first server 120 may execute the risk mitigated predictive tax loan or monetary advance process according to the disclosed principles using data stored in database 124, database 144 and or received from second server 140 and/or user device 150. First service 122 or second service 142 may implement an information service, which may maintain data used throughout the process that may provide a risk mitigated predictive tax loan and or predictive tax withholdings. The information service may be any network 110 accessible service such as TurboTax®, QuickBooks®, QuickBooks® Payroll, Mint®, Credit Karma™, and their respective variants, offered by Intuit® of Mountain View Calif.

User device 150 may be any device configured to present user interfaces and receive inputs thereto. For example, user device 150 may be a smartphone, personal computer, tablet, laptop computer, or other device.

First server 120, second server 140, first database 124, second database 144, and user device 150 are each depicted as single devices for ease of illustration, but those of ordinary skill in the art will appreciate that first server 120, second server 140, first database 124, second database 144, and/or user device 150 may be embodied in different forms for different implementations. For example, any or each of first server 120 and second server 140 may include a plurality of servers or one or more of the first database 124 and second database 144. Alternatively, the operations performed by any or each of first server 120 and second server 140 may be performed on fewer (e.g., one or two) servers. In another example, a plurality of user devices 150 may communicate with first server 120 and/or second server 140. A single user may have multiple user devices 150, and/or there may be multiple users each having their own user device(s) 150.

Figure 2:
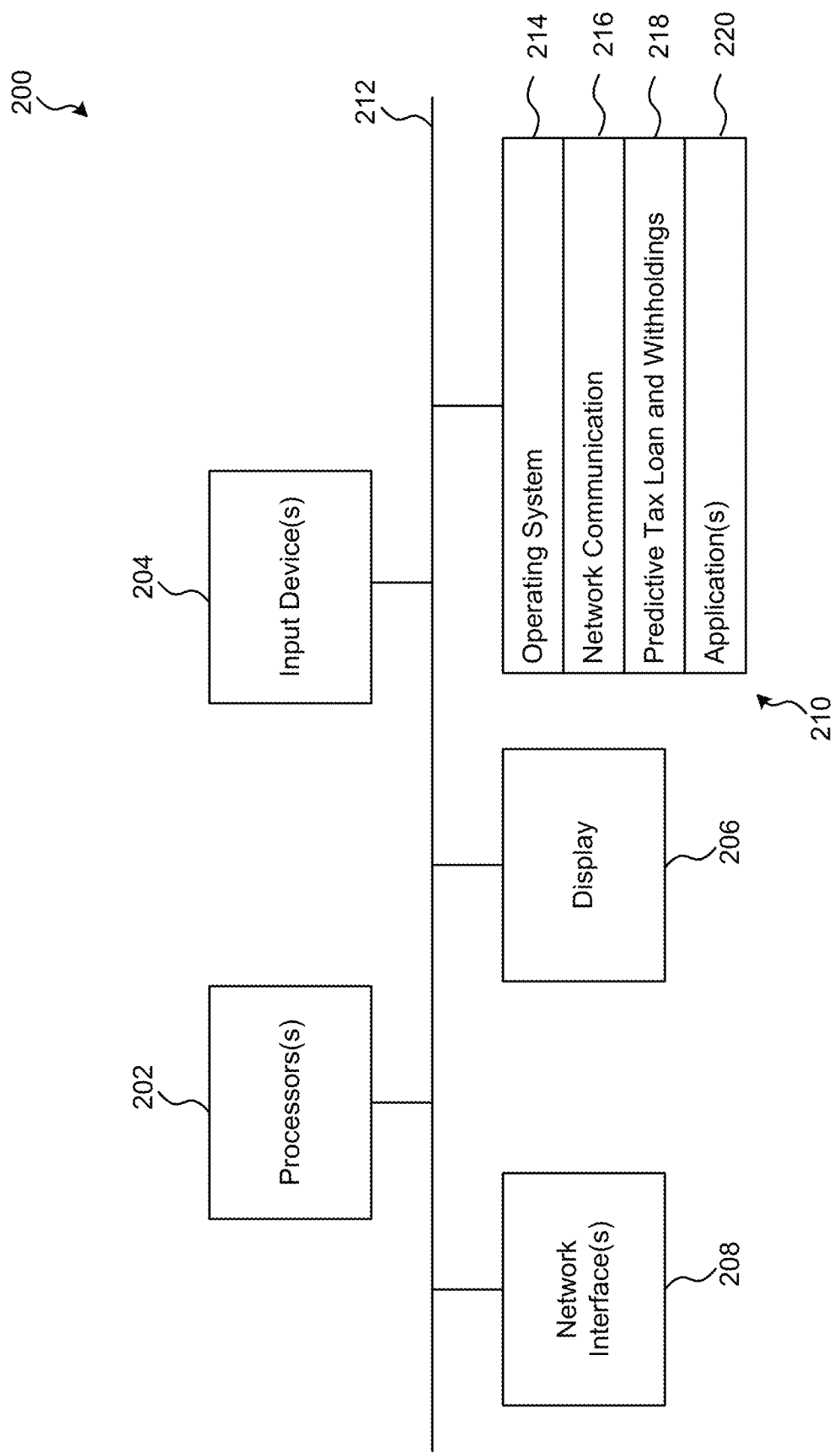
FIG. 2 shows a server device according to an embodiment of the present disclosure.

FIG. 2 is a block diagram of an example computing device 200 that may implement various features and processes as described herein. For example, computing device 200 may function as first server 120, second server 140, or a portion or combination thereof in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable media 210. Each of these components may be coupled by a bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Predictive tax loan and withholdings instructions 218 may include instructions that implement the disclosed additional monthly income processing described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks;

magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
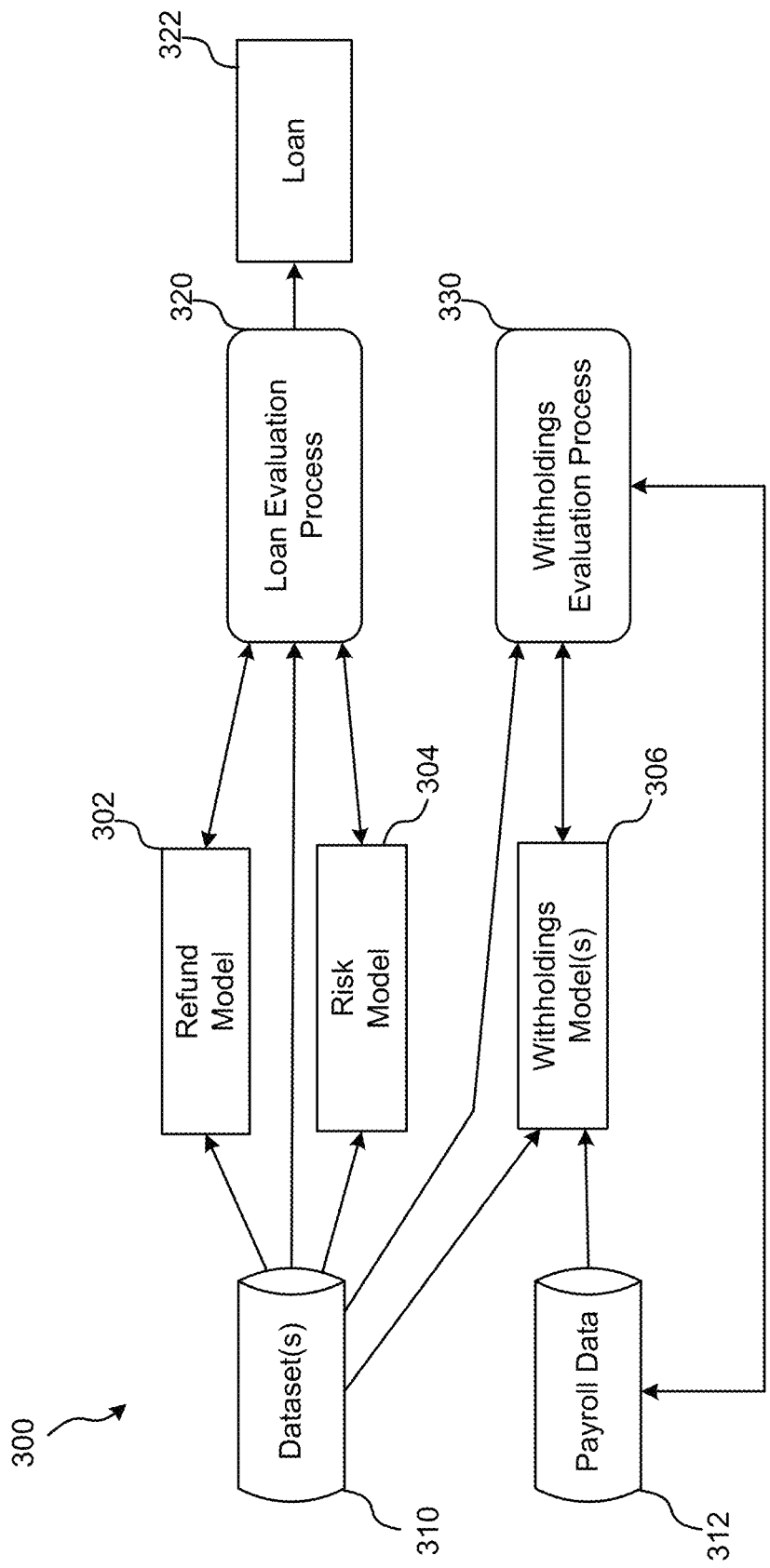
FIG. 3 shows a functional block diagram of an example process for providing additional monthly income by providing a risk mitigated predictive tax loan and or predictive tax withholdings according to an embodiment of the present disclosure.

FIG. 3 illustrates a functional block diagram of an example process 300 for providing additional monthly income by providing a risk mitigated predictive tax loan and or predictive tax withholdings according to an embodiment of the present disclosure. Although the disclosed principles are described as providing "monthly" income, it should be appreciated that the disclosed principles may provide additional income on any periodic (weekly, bi-weekly, etc.) basis. In addition, the tax loan features of the disclosed embodiments may be used to issue an aperiodic, lump sum payment if desired. Accordingly, while the process 300 is now described as providing monthly relief to a taxpayer, it should be appreciated that the process 300 is not so limited and may provide additional periodic or aperiodic income to certain taxpayers in accordance with the disclosed principles.

The process 300 may include a tax loan evaluation process 320 and a tax withholdings evaluation process 330. In one or more embodiments, the tax loan evaluation process 320 may train and use machine learning models such as a tax refund model 302 and a separate taxpayer risk model 304. In one or more embodiments, the tax loan evaluation process 320 may determine and provide a tax loan 322 for low risk taxpayers as discussed below in more detail. In addition, the tax loan may be provided in monthly installments, which may be dynamically adjusted for certain taxpayers.

In one or more embodiments, the tax withholdings evaluation process 330 may train and use one or more machine learning tax withholding models 306. In one or more embodiments, the tax withholdings evaluation process 330 may provide predictive tax withholdings that may be stored with payroll data 312 used by a payroll service to deduct the predicted amount of tax withholdings from the taxpayer's paycheck. In one or more embodiments, the tax withholdings evaluation process 330 may use information from services related to the payroll service to provide better tax withholding estimates for certain taxpayers. For example, if the taxpayer's employer uses a payroll service such as QuickBooks® Payroll, and a taxpayer uses related services such as TurboTax®, QuickBooks®, Mint®, Credit Karma™, and or their respective variants, models and information from the related services may be used by the tax withholdings evaluation process 330 to better estimate the tax withholdings deducted by the payroll service. Accordingly, each related service may have its own machine learning withholding model 306 that may be trained and used in accordance with the disclosed principles.

The disclosed models 302, 304, 306 may have access to one or more datasets 312 having data necessary to train and use the models 302, 304, 306 in accordance with the tax loan evaluation process 320 and tax withholdings evaluation process 330. The tax withholdings evaluation process 330 and its corresponding models 306 may use and or update payroll data 312 for certain taxpayers as discussed herein.

In one embodiment, system 100 may perform some or all of the processing illustrated in FIG. 3. For example, first server 120 may perform the tax loan evaluation process 320 and tax withholdings evaluation process 330 discussed in detail below with respect to FIGS. 4-5. Moreover, during the execution of the processes 320, 330, first server 120 may input the dataset(s) 310 and payroll data 312 from a database, which may be the first database 124 and or second database 144, and or the second server 140 and/or user device 150.

Figure 4:
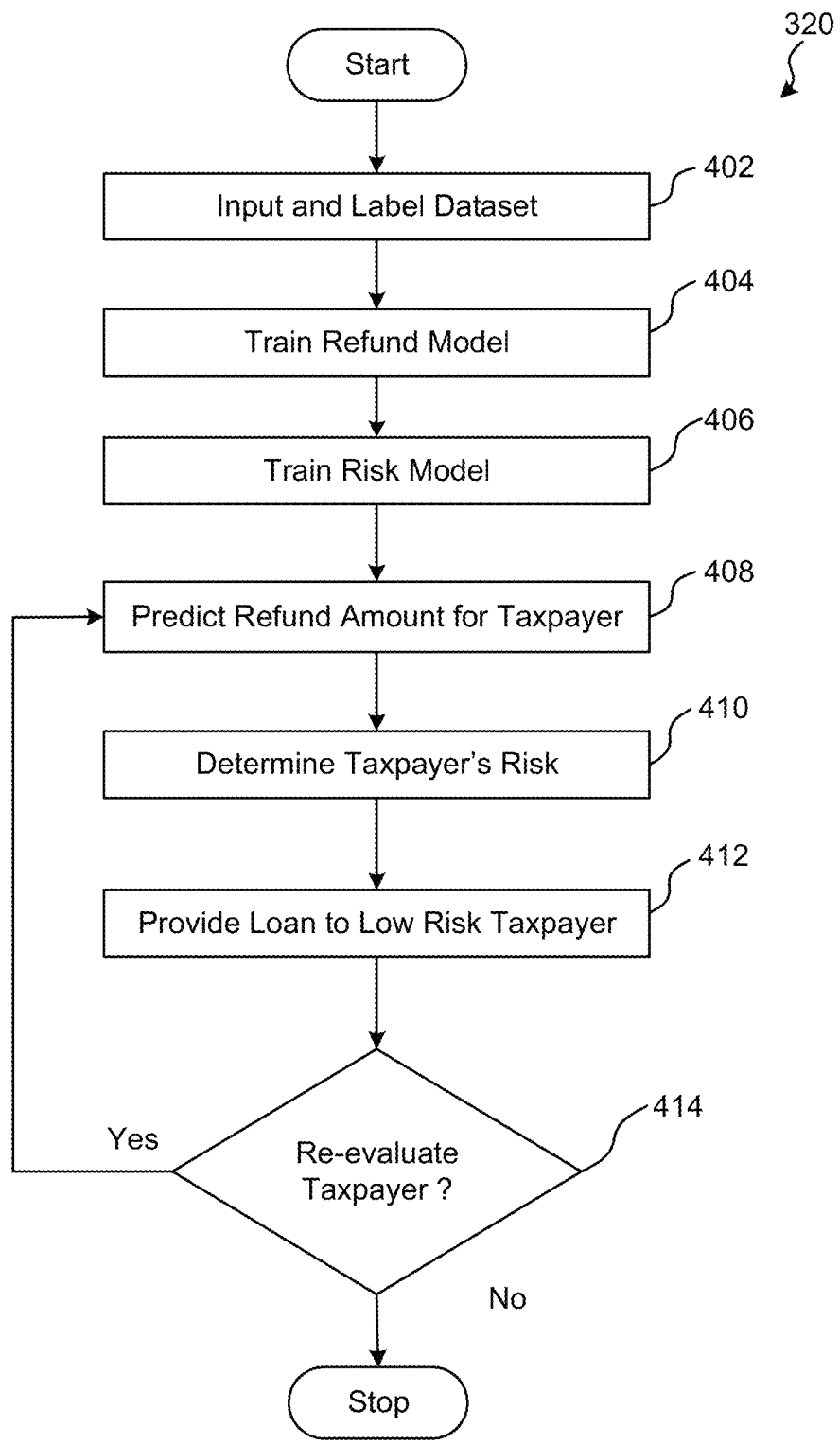
FIG. 4 shows an example tax loan evaluation process according to an embodiment of the present disclosure that may be used in the process illustrated in FIG. 3.

FIG. 4 illustrates an example tax loan evaluation process 320 that may be used in the process 300 illustrated in FIG. 3. As discussed in more detail below, the process 320 may separately profile two aspects for the potential tax loan or monetary advance: 1) predicted refund amount; and 2) risk associated with providing the loan to the particular taxpayer. To that end, two separate machine learning models may be used, a tax refund model (e.g., model 302) and a taxpayer risk model (e.g., model 304). The two models may input data from the same or different datasets and may be trained in accordance with the disclosed principles. In one or more embodiments, the data may be related to the taxpayers' industry, workplace stability, historical refund amounts, to name a few. Demographic information (e.g., age, marital status, income, education, and employment) may also be used during the process 320. Moreover, as discussed further below, the process 320 may be able to dynamically adjust monthly payments of a predicted loan amount for certain taxpayers that provide additional or updated data throughout the year.

At step 402, the process 320 may input data from a database such as e.g., an online community database associated with a plurality of taxpayers. For example, if the process 320 is being performed as part of the TurboTax® or TurboTax® Live service, then the input dataset (e.g., dataset 310) may come from a TurboTax® and or TurboTax® Live community database, which may have data for millions of taxpayers. In one or more embodiments, data is input and grouped for each past taxpayer within the community (e.g., TurboTax® user) dating back at least two years. It should be appreciated that the further back the data goes, the more accurate the process 320 may become. Accordingly, the disclosed principles are not limited to two years' worth of data.

At step 402, the process 320 may also label the input data for use with the tax refund and taxpayer risk models. In one or more embodiments, the most recent year's data may be used for labelling the input data. Labelled attributes may include minimum refund amount, maximum refund amount, median refund amount, mean refund amount, standard error of the refund mean, industry code, credit card score, number of jobs switched in the past five years, to name a few. It should be appreciated that these are examples of labels that may be used and that the disclosed principles are not limited to the illustrated examples.

At step 404, the process 320 may train the tax refund model (e.g., model 302) using the labeled input data from step 402. In one or more embodiments, the tax refund model may be a regression model using the prior year's refund data as labels. The model may be trained by passing the labeled data through the model. A regression model may be used for regression analysis to estimate the relationships between a dependent variable (often called the "outcome variable") and one or more independent variables (often called "predictors" or "features"). Types of regression models that may be used for the tax refund model include, but are not limited to, linear regression, polynomial regression, quantile regression, lasso regression, elastic net regression, or principal components regression (PRC), to name a few.

At step 406, the process 320 may train the tax risk model (e.g., model 304) using the labeled input data from step 402. In one or more embodiments, the tax refund model may be a classification model. The model may be trained by passing the labeled data through the model. A classification model attempts to draw one or more conclusions from the input values given to it for training. A classification model output is often a probability number for the dataset typically between 0 and 1. Types of classification models that may be used for the tax risk model include, but are not limited to, logistic regression, Naïve Bayes, stochastic gradient descent, K-nearest neighbors, decision tree, random forest, support vector machine (SVM), xgboost, and convolutional neural network (CNN), to name a few.

At 408, the process 320 may predict a tax refund amount for a particular taxpayer using the trained tax refund model (e.g., e.g., model 304). In one or more embodiments, the predicted tax refund amount may be used as the basis for the taxpayer's tax loan. In one or more embodiments, the predicted refund amount and hence the loan amount may be a refund amount with a confidence interval over a predetermined threshold. For example, the predetermined threshold may be a 90% confidence level as determined by the tax refund model. In one or more embodiments, a lowest estimated refund amount with a confidence level above the predefined threshold (e.g. 90% confidence level) may be used as the loan amount. It should be appreciated that the predefined threshold is not limited to a 90% confidence level and that the disclosed principles may use a higher or lower threshold if desired.

At 410, the process 320 may predict the risk of providing the particular taxpayer with the tax loan using the trained risk model. In one or more embodiments, if it is believed that there is not enough data to properly assess the taxpayer's risk, the taxpayer's credit score may be used to assess his/her risk. The credit score may be may be one of the attributes retrieved from the input data (at step 402) or it may be retrieved from a credit bureau database via the network 110. In one or more embodiments, regardless of the model's determination of a taxpayer's risk, a taxpayer's risk level may be set to a "high risk" if it is determined that the taxpayer has not targeted its refund (or loaned amount) to the tax preparation service in advance—that is, a taxpayer will be a "high risk" taxpayer if he/she has elected to directly receive all of its tax refund instead of directing the refund (minus adjustments) to the tax preparation service. Likewise, a taxpayer will be a "high risk" taxpayer if he/she has not set up or selected an option to automatically repay his/her potential tax loan to the tax preparation service via an automatic deduction from its tax refund.

At 412, a taxpayer having a risk level (as determined at step 410) below a predetermined rick threshold may be provided a loan in the refund amount determined at step 408. In one or more embodiments, a taxpayer with a risk level below the predetermined rick threshold may be declared a "low risk" taxpayer and be afforded the opportunity to accept the predicted tax loan. In one or more embodiments, the user may be presented with a graphical user interface, link and or other selection process to accept the tax loan.

In one or more embodiments, the tax loan may be provided in monthly installments. In one or more embodiments, the number of monthly installments may be determined by the process 320 (e.g., using the number of months between the present date and the anticipated tax refund receipt date) and or it may be selected by the taxpayer (via an option when prompted to accept the loan).

In accordance with the disclosed principles, taxpayers that provide the process 320 with additional data (e.g., data beyond what the tax preparation service requires to prepare an electronic tax return) may be re-examined periodically (e.g., monthly) to adjust his/her expected tax return and hence his/her monthly loan installments. For example, at step 414, using taxpayer information for taxpayers in which the system 100 and processes 300, 320 know more about, the process 320 may update the tax refund and risks models every month using the updated information. Qualifying taxpayers may then have his/her loan and risk evaluations updated at the same rate.

The additional data may be input from other services related to the service performing process 320. For example, if process 320 is being performed as part of the TurboTax® or TurboTax® Live tax preparation services, then related services may include QuickBooks®, QuickBooks® Payroll, Mint®, and variants thereof. For example, a Mint® user who has changed his/her workplace since receiving a tax loan may eventually receive a different tax refund than what was predicted (at step 408) when his/her return is actually filed and or may have altered its risk score from what was determined at step 410. That is, the anticipated refund amount may have increased/decreased depending upon the taxpayer's new circumstances. Likewise, the taxpayer's ability to repay the loan may have become less or more risky.

These changes may be taken into account by reevaluating the taxpayer in accordance with the disclosed principles. Moreover, additional information may be provided by the taxpayers themselves by completing surveys and requests for information from the tax preparation service. For these types of taxpayers, the process 320 may update the taxpayer's monthly installment by continuing at step 408 (and using the updated tax refund and risk models).

Figure 5:
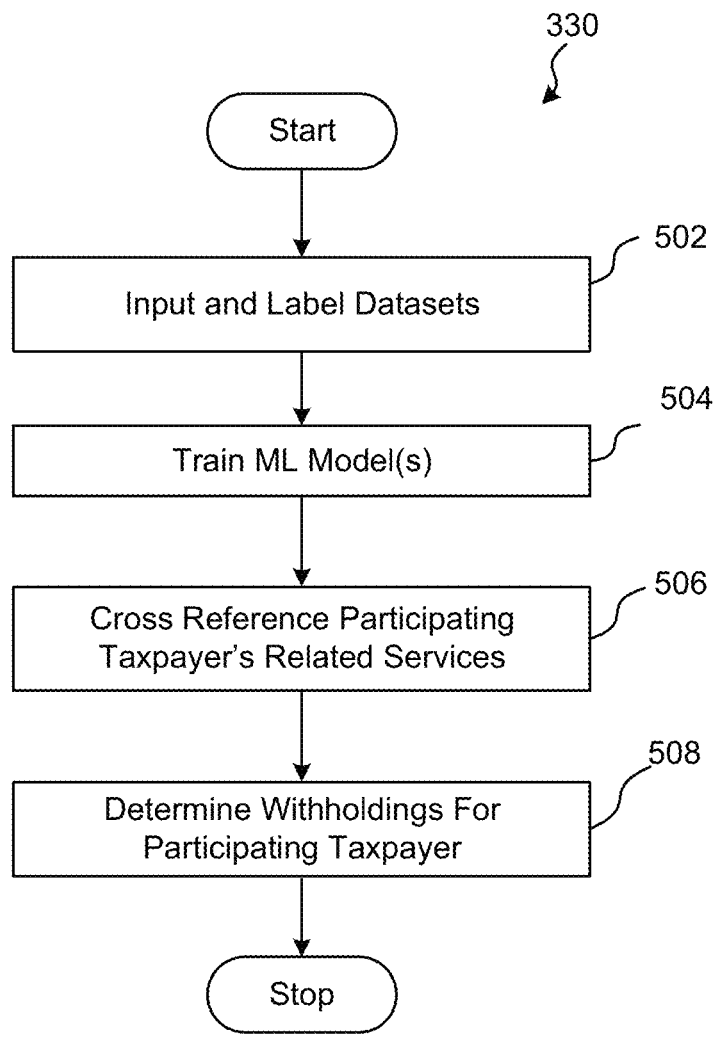
FIG. 5 shows an example tax withholdings evaluation process according to an embodiment of the present disclosure that may be used in the process illustrated in FIG. 3.

FIG. 5 illustrates an example tax withholdings evaluation process 330 that may be used in the process 300 illustrated in FIG. 3. As noted above, in one or more embodiments, the tax withholdings evaluation process 330 may use information from services related to the payroll service to provide better tax withholding estimates for certain taxpayers. For example, if the taxpayer's employer uses a payroll service such as QuickBooks® Payroll, and a taxpayer uses related services such as TurboTax®, QuickBooks®, Mint®, Credit Karma™, and or their respective variants, additional models (e.g., withholding models 306) and information from the related services may be used by the tax withholdings evaluation process 330 to better estimate the tax withholdings to be deducted by the payroll service. Accordingly, each related service may have its own machine learning withholding model 306 that may be trained and used in accordance with the disclosed principles.

For example, at step 502, the payroll service and each related service may input and label data to be used for its respective model. In one or more embodiments, the labeled attributes may vary for each service. Example labeled attributes include, but are not limited to, salary amount, salary fluctuation, extra work shifts, overtime pay, salary raise, second job, savings and or checking account balances, credit score, past refund amounts, life changing events (e.g., marriage, birth of child), indications of deductible expenses, and employer related data (e.g., industry), to name a few. In addition, changes in federal and or state tax policies may be input into one or more models or the decision making processed described herein. That is, changes in state/federal code can be embedded in the regression model by adding a component with some business logic adjusting the output due to the change in law. For example, if the Florida state tax is higher this year, the disclosed principles can penalize all Florida residents with a decrease in their expected refund.

At step 504, each service's tax withholdings model may be trained using the relevant collected and labeled dataset. In one or more embodiments, the prediction of tax withholdings is approached as a regression problem. Accordingly, the models used for the tax withholdings models are regression models such as the ones discussed above with respect to FIG. 4. In a supervised learning framework, the labeled attributes of the taxpayers' financial status (as known by the relevant service) are retroactively set at the end of the year to set the "correct" withholding amount for the prior year. That is, after a tax year ends and refunds are issued, the process (at step 504) automatically "corrects" the tax withholdings backwards in the training dataset. As can be appreciated, this makes each model more accurate as the actual determined withholding amounts and factors contributing to them may be entered into the models to retrain them.

At step 506, taxpayers associated with the payroll service (e.g., QuickBooks® Payroll) are crossed-reference with users of the related services (e.g., TurboTax®, QuickBooks®, Mint®, Credit Karma™, etc.) to determine if they are eligible to receive adjusted tax withholdings in accordance with the tax withholdings evaluation process 330. In one or more embodiments, the process 330 may use taxpayer name, address, phone number, and or social security number to find related services for the tax payer. In one or more embodiments, financial data may be crossed referenced as well. For example, salary details issued by the payroll service may be cross-referenced with transaction data extracted by a financial service (e.g., Mint®), tax filing data from a tax preparation service (TurboTax®), credit score data from a credit service (Credit Karma™), bank account data, to name a few.

Taxpayers identified with one or more of the related services may be eligible for the predictive tax withholdings disclosed herein. In one or more embodiments, eligible taxpayers may be given an option to "opt in" to adjust his/her withholdings based on the predicted tax withholdings disclosed herein. The option may be provided by the payroll service via a graphical user interface, link, emailed communication and or other form of communication. Taxpayers that do not opt in to adjust his/her withholdings based on the predicted tax withholdings disclosed herein may continue to have its withholdings based on his/her W-4 form.

At step 508, the eligible taxpayer's information is run through the trained models and his/her tax withholdings are set based on the collective outputs of the models. For example, when more than one model is used, there is room to implement a policy of how to distill the multiple results into a single action/result. For example, the disclosed system and process can run multiple regression models and decide to use the average or the lower range of the outputs. The disclosed principles, may also apply a more complex policy such as using the output of the model that is most confident. In one or more embodiments, the policy may implement a decision-tree like policy for selecting the best output. The predictive tax withholdings are set in the data of the payroll service and used to deduct federal and or state taxes from the taxpayer's paycheck. As can be appreciated, the disclosed process 330 may determine tighter, more accurate tax withholdings based on the numerous data points and trained models.

As can be appreciated, the disclosed systems and processes provide several advantages over conventional tax loan services and payroll services to provide certain taxpayers with more periodic (e.g., monthly) income. For example, currently, there is not one service in the market that offers tax loans before a taxpayer prepares and or submits a tax return. By mitigating risk and predicting an accurate future tax refund amount, a taxpayer may be able to receive much need periodic income relief by receiving his/her tax refund when it is needed as opposed to waiting a year to receive it. Moreover, by dynamically altering the installments, the disclosed principles ensure that the taxpayer is receiving payments he/she can repay when his/her refund is received—thus, further mitigating the risk to the loan provider.

In one or more embodiments, millions of relevant data and data points are analyzed and or used to train separate tax refund and tax risk models for determining tax loans and associated risks of providing the loans to certain taxpayers. The data may be retrieved from one or more networked systems, devices and or storage mediums. The data used is too massive and diverse and cannot be processed without the distributed system architecture disclosed herein. By separately modeling predicted refund amount and risk, two different types of machine learning models may be used— that is, an specific model type (e.g., regression model) may be used for determining a predicted refund, while another specific model type (e.g., classification) may be used for determining the risk of providing a particular taxpayer with the loan as refund amount and risk are two entirely different attributes requiring different forms of analysis.

In addition, by allowing for dynamic updating of certain taxpayers' refund amount and risk, the disclosed principles utilize non-traditional sources of information to ensure the disclosed systems/processes are accurately serving the taxpayers' needs as well as the loan provider's. The disclosed principles provide taxpayers the ability to stay engaged in his/her finances and tax obligations by providing the dynamically updated loan installments, etc.

Moreover, by more accurately determining a taxpayer's paycheck tax withholdings, the taxpayer may be provided with more periodic take home pay while still meeting his/her tax obligations. As with other processes disclosed herein, the tax withholdings processing utilizes millions of relevant data and data points and separate financial and or tax services to train and use models in a retroactive manner. The data may be retrieved from one or more networked systems, devices and or storage mediums. The data used is too massive and diverse and cannot be processed without the distributed system architecture disclosed herein.

Moreover, the disclosed principles may determine tax withholdings that are more precise than the conventional W-4-based tax withholdings. In addition, the tax withholdings process may combine two or more separate computer systems and services, and their respective data sources, in a non-conventional manner for estimating tax withholdings, which are typically determined by the payroll service. The disclosed principles utilize a non-trivial setting of supervised learning whereby the target variable (i.e., withholding amount) is set retrospectively and rich, non-trivial features may be taken from multiple separate systems.

As such, the disclosed processes are an advancement in the tax preparation, tax estimation and machine learning arts as millions of data and data points from diverse systems may be used in non-conventional manners for specific purposes: 1) tax loans determined, provided and or adjusted before a tax return is even provided; and 2) accurate tax withholdings amounts provided based on more relevant information, including non-payroll information.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method for providing additional periodic income to a taxpayer, the method provided by a tax preparation service to a community of taxpayers who have used the tax preparation service in the past to prepare tax returns for the taxpayers, said method comprising:

training, by a first server, a regression model for predicting tax refund amounts using a supervised learning framework, by:
  retrieving data, via a second server, from a community database comprising data associated with the taxpayer and data for a plurality of additional taxpayers comprising the community of taxpayers;
  labeling the retrieved data from the community database, based on a prior year's tax refund of the taxpayers within the community, with a first set of labels, wherein the labels comprise attributes relating to tax refunds including one or more of minimum refund amount, maximum refund amount, median refund amount, mean refund amount, standard error of the refund mean, industry code, credit score, or number of jobs; and
  passing data labeled with the first set of labels through the regression model to generate a trained regression model;

receiving, from a mobile computing device associated with the taxpayer, a request for additional periodic income, wherein the income comprises a tax refund loan paid by the tax preparation service to the taxpayer in installments, wherein the request is received via an interface on the mobile computing device generated by an application executing on the mobile computing device;

inputting, in response to receiving the request, by the first server, a first set of data, different from the data retrieved from the community database, associated with the taxpayer into the trained regression model for predicting a tax refund amount for the taxpayer without the tax preparation service or the taxpayer preparing a tax return, the trained regression model outputting the predicted tax refund;

training, by the first server, a classification model for predicting tax loan risk using a supervised learning framework by:
  labeling the retrieved data from the community database, based on risks associated with the taxpayers within the community, with a second set of labels, wherein the second set of labels comprises at least the first set of labels; and
  passing data labeled with the second set of labels through the classification model to generate a trained classification model;

inputting, in response to receiving the request, by the first server, the first set of data associated with the taxpayer into the trained classification model for determining a risk of providing a tax loan to the taxpayer, the trained classification model being of a different type of model than a type of the trained regression model, the trained classification model outputting the determined risk of providing the tax loan to the taxpayer;

determining whether the taxpayer may be provided the tax refund loan in an amount of the predicted tax refund based on the determined risk, wherein the risk is based at least in part on whether the taxpayer uses the tax preparation service to prepare the current tax return;

training, by the first server, a second regression model for
   tax withholding analysis using a supervised learning
   framework by:
  labeling the retrieved data from the communicate database, based on job attributes and payroll data associated with the taxpayers within the community, with a third set of labels;
  passing data labeled with the third set of labels through the second regression model to generate a second trained regression model for predicting withholding amounts;
receiving, from the mobile computing device via the interface, by the first server, a request by the taxpayer to opt in for providing additional withholding data to the tax preparation service, wherein the additional withholding data is provided by services related to but separate from the tax preparation service and comprises payroll, credit score, and accounting data associated with the taxpayer;
in response to the taxpayer opting in for providing additional withholding data:
  inputting, by the first server, a first set of additional withholding data associated with a taxpayer into the second trained regression machine learning model for predicting a tax withholding amount for each pay period for the taxpayer;
determining, based on the output of the models, that the taxpayer may be provided with a tax refund loan in a defined amount to be paid to the taxpayer on an installment basis;
in response to determining that the taxpayer may be provided with the tax loan, presenting a selection graphical object, in the user interface, for the taxpayer to accept the loan;
in response to receiving a selection of the taxpayer accepting the loan, generating an additional periodic income for the taxpayer by:
  providing the taxpayer with the tax loan when it is determined that the taxpayer may be provided the tax loan, the tax loan being provided in periodic installments;
  monitoring, using the models, the taxpayer's additional withholding data on a periodic basis; and
  adjusting, based on the output of the models, the amount of the periodic loan payments to the taxpayer.

2. The method of claim 1, wherein the periodic installments comprise monthly installments.

3. The method of claim 2, wherein adjusting the amount of the periodic loan payments to the taxpayer further comprises:
  receiving updated data associated with the taxpayer;
  passing the updated data associated with the taxpayer through the trained regression model to determine an updated predicted tax refund;
  passing the updated data associated with the taxpayer through the trained classification model to determine an updated risk of providing the tax loan to the taxpayer; and
  adjusting an amount of the monthly installments based on the updated predicted tax refund and the updated risk of providing the tax loan to the taxpayer.

4. The method of claim 3, wherein the updated data associated with the taxpayer is received from one or more of financial services associated with the taxpayer or data from a survey that was completed by the taxpayer.

5. The method of claim 1, further comprising:
  using the predictive tax withholding amount to increase the taxpayer's pay period income for a paycheck.

6. The method of claim 5, wherein the second trained regression model is trained retroactively by:
  labeling attributes of community tax data after a completion of a tax year; and
  passing the labeled attributes of the community tax data through the second regression model.

7. A system for providing additional periodic income to a taxpayer of a community of taxpayers who have used a tax preparation service in the past to prepare tax returns for the taxpayers, said system comprising:
  a first computing device connected to a second computing device through a network connection, the first computing device configured to:
    train regression model for predicting tax refund amounts using a supervised learning framework, by:
      retrieving data, via the second computing device, from a community database comprising data associated with the taxpayer and data for a plurality of additional taxpayers comprising the community of taxpayers;
      labeling the retrieved data from the community database, based on a prior year's tax refund of the taxpayers within the community, with a first set of labels, wherein the labels comprise attributes relating to tax refunds including one or more of minimum refund amount, maximum refund amount, median refund amount, mean refund amount, standard error of the refund mean, industry code, credit score, or number of jobs; and
      passing data labeled with the first set of labels through the regression model to generate a trained regression model;
    receive, from a mobile computing device associated with the taxpayer, a request for additional periodic income, wherein the income comprises a tax refund loan paid by the tax preparation service to the taxpayer in installments, wherein the request is received via an interface on the mobile computing device generated by an application executing on the mobile computing device;
    input, in response to receiving the request, a first set of data, different from the data retrieved from the community database, associated with the taxpayer into the trained regression model for predicting a tax refund amount for the taxpayer without the tax preparation service or the taxpayer preparing a tax return, the trained regression model outputting the predicted tax refund;
    train a classification model for predicting tax loan risk using a supervised learning framework by:
      labeling the retrieved data from the community database, based on risks associated with the taxpayers within the community, with a second set of labels, wherein the second set of labels comprises at least the first set of labels; and
      passing data labeled with the second set of labels through the classification model to generate a trained classification model;
    input, in response to receiving the request, the first set of data associated with the taxpayer into the trained classification model for determining a risk of providing a tax loan to the taxpayer, the trained classification model being of a different type of model than a type of the trained regression model, the trained classification model outputting the determined risk of providing the tax loan to the taxpayer;

determine whether the taxpayer may be provided the tax refund loan in an amount of the predicted tax refund based on the determined risk, wherein the risk is based at least in part on whether the taxpayer uses the tax preparation service to prepare the current tax return;

train a second regression model for tax withholding analysis using a supervised learning framework by:
labeling the retrieved data from the communicate database, based on job attributes and payroll data associated with the taxpayers within the community, with a third set of labels;
passing data labeled with the third set of labels through the second regression model to generate a second trained regression model for predicting withholding amounts;

receive, from the mobile computing device via the interface, a request by the taxpayer to opt in for providing additional withholding data to the tax preparation service, wherein the additional withholding data is provided by services related to but separate from the tax preparation service and comprises payroll, credit score, and accounting data associated with the taxpayer;

in response to the taxpayer opting in for providing additional withholding data:
input a first set of additional withholding data associated with a taxpayer into the second trained regression machine learning model for predicting a tax withholding amount for each pay period for the taxpayer;

determine, based on the output of the models, that the taxpayer may be provided with a tax refund loan in a defined amount to be paid to the taxpayer on an installment basis;

in response to determining that the taxpayer may be provided with the tax loan, present a selection graphical object, in the user interface, for the taxpayer to accept the loan;

in response to receiving a selection of the taxpayer accepting the loan, generate an additional periodic income for the taxpayer by:
providing the taxpayer with the tax loan if it is determined that the taxpayer may be provided the tax loan, the tax loan being provided in periodic installments;
monitoring, using the models, the taxpayer's additional withholding data on a periodic basis; and
adjusting, based on the output of the models, the amount of the periodic loan payments to the taxpayer.

8. The system of claim 7, wherein the periodic installments comprise monthly installments.

9. The system of claim 8, wherein, to adjust the amount of the periodic loan payments to the taxpayer, the first computing device is further configured to:
receive updated data associated with the taxpayer;
pass the updated data associated with the taxpayer through the trained regression model to determine an updated predicted tax refund;
pass the updated data associated with the taxpayer through the trained classification model to determine an updated risk of providing the tax loan to the taxpayer; and
adjust an amount of the monthly installments based on the updated predicted tax refund and the updated risk of providing the tax loan to the taxpayer.

10. The system of claim 9, wherein the updated data associated with the taxpayer is received from one or more of financial services associated with the taxpayer or data from a survey that was completed by the taxpayer.

11. The system of claim 7, wherein the second trained regression model is trained retroactively by:
labeling attributes of community tax data after a completion of a tax year; and
passing the labeled attributes of the community tax data through the second regression model.

12. A computer implemented method for providing additional periodic income to a taxpayer, the method provided by a tax preparation service to a community of taxpayers who have used the tax preparation service in the past to prepare tax returns for the taxpayers, said method comprising:
training, by a computing device, a regression model for predicting tax refund amounts using a supervised learning framework, by:
retrieving data from a community database comprising data associated with the taxpayer and data for a plurality of additional taxpayers comprising the community of taxpayers;
labeling the retrieved data from the community database, based on a prior year's tax refund of the taxpayers within the community, with a first set of labels, wherein the labels comprise attributes relating to tax refunds including one or more of minimum refund amount, maximum refund amount, median refund amount, mean refund amount, standard error of the refund mean, industry code, credit score, or number of jobs; and
passing data labeled with the first set of labels through the regression model to generate a trained regression model;

receiving, from a mobile computing device associated with the taxpayer, a request for additional periodic income, wherein the income comprises a tax refund loan paid by the tax preparation service to the taxpayer in installments, wherein the request is received via an interface on the mobile computing device generated by an application executing on the mobile computing device;

inputting, in response to receiving the request, by the computing device, a first set of data, different from the data retrieved from the community database, associated with the taxpayer into the trained regression model for predicting a tax refund amount for the taxpayer without the tax preparation service or the taxpayer preparing a tax return, the trained regression model outputting the predicted tax refund;

training, by the computing device, a classification model for predicting tax loan risk using a supervised learning framework by:
labeling the retrieved data from the community database, based on risks associated with the taxpayers within the community, with a second set of labels, wherein the second set of labels comprises at least the first set of labels; and
passing data labeled with the second set of labels through the classification model to generate a trained classification model;

inputting, in response to receiving the request, by the computing device, the first set of data associated with the taxpayer into the trained classification model for determining a risk of providing a tax loan to the taxpayer, the trained classification model being of a different type of model than a type of the trained regression model, the trained classification model outputting the determined risk of providing the tax loan to the taxpayer;

determining whether the taxpayer may be provided the tax refund loan in an amount of the predicted tax refund based on the determined risk, wherein the risk is based at least in part on whether the taxpayer uses the tax preparation service to prepare the current tax return;

training, by the computing device, a second regression model for tax withholding analysis using a supervised learning framework by:

labeling the retrieved data from the communicate database, based on job attributes and payroll data associated with the taxpayers within the community, with a third set of labels;

passing data labeled with the third set of labels through the second regression model to generate a second trained regression model for predicting withholding amounts;

receiving, from the mobile computing device via the interface, by the computing device, a request by the taxpayer to opt in for providing additional withholding data to the tax preparation service, wherein the additional withholding data is provided by services related to but separate from the tax preparation service and comprises payroll, credit score, and accounting data associated with the taxpayer;

in response to the taxpayer opting in for providing additional withholding data:

inputting, by the computing device, a first set of additional withholding data associated with a taxpayer into the second trained regression machine learning model for predicting a tax withholding amount for each pay period for the taxpayer;

determining, based on the output of the models, that the taxpayer may be provided with a tax refund loan in a defined amount to be paid to the taxpayer on an installment basis;

in response to determining that the taxpayer may be provided with the tax loan, presenting a selection graphical object, in the user interface, for the taxpayer to accept the loan;

in response to receiving a selection of the taxpayer accepting the loan, generating an additional periodic income for the taxpayer by:

providing the taxpayer with the tax loan when it is determined that the taxpayer may be provided the tax loan, the tax loan being provided in periodic installments;

monitoring, using the models, the taxpayer's additional withholding data on a periodic basis; and adjusting, based on the output of the models, the amount of the periodic loan payments to the taxpayer.

13. The method of claim 12, wherein the periodic installments comprise monthly installments.

14. The method of claim 13, wherein adjusting the amount of the periodic loan payments to the taxpayer further comprises:

receiving updated data associated with the taxpayer;

passing the updated data associated with the taxpayer through the trained regression model to determine an updated predicted tax refund;

passing the updated data associated with the taxpayer through the trained classification model to determine an updated risk of providing the tax loan to the taxpayer; and adjusting an amount of the monthly installments based on the updated predicted tax refund and the updated risk of providing the tax loan to the taxpayer.

\* \* \* \* \*